US006054006A

United States Patent [19]
Pilon et al.

[11] Patent Number: 6,054,006
[45] Date of Patent: Apr. 25, 2000

[54] METHOD AND APPARATUS FOR APPLYING A PRINTED LABEL TO A METAL CONTAINER AND THE LABELED CONTAINER PRODUCED THEREBY

[75] Inventors: Betty Jean Pilon, Vankleek Hill; Gilles Fournier, St. Eugene; Terrence Doherty, Brownsburg, all of Canada

[73] Assignee: Great Pacific Enterprises, Inc., through its division, Montebello Packaging, Hawksbury, Canada

[21] Appl. No.: 08/980,842

[22] Filed: Dec. 1, 1997

[51] Int. Cl.[7] .......................... B44C 1/165; B32B 31/00; B29C 67/00; B65D 41/00

[52] U.S. Cl. .......................... 156/230; 156/240; 156/241; 156/298; 156/309.6; 156/321; 156/DIG. 6; 156/DIG. 21; 156/DIG. 36; 220/359.1

[58] Field of Search .................................... 156/215, 230, 156/233, 240, 241, 298, DIG. 6, DIG. 8, DIG. 12, DIG. 21, DIG. 36, DIG. 51, 300, 321, 309.6; 220/359.1; 40/306

[56] References Cited

U.S. PATENT DOCUMENTS

| | | | |
|---|---|---|---|
| 1,913,839 | 6/1933 | Lermer . | |
| 3,340,121 | 9/1967 | Lawrenz | 156/233 |
| 3,553,044 | 1/1971 | McDermott | 156/155 |
| 3,980,512 | 9/1976 | Rauser | 156/231 |
| 4,012,270 | 3/1977 | Fitko | 156/306 |

(List continued on next page.)

FOREIGN PATENT DOCUMENTS

| | | | |
|---|---|---|---|
| 1064775 | 10/1979 | Canada | 117/9 |
| 1194725 | 10/1985 | Canada | 101/3 |
| 1259189 | 9/1989 | Canada | 40/27 |
| 2002285 | 5/1990 | Canada . | |
| 2008253 | 12/1990 | Canada | 117/6 |
| 2020386 | 1/1991 | Canada . | |
| 1323982 | 11/1993 | Canada | 40/24 |
| WO95/34263 | 12/1995 | WIPO . | |
| W097/29957 | 8/1997 | WIPO . | |

OTHER PUBLICATIONS

Product Report, Packaging Technology and Engineering, vol. 5 No. 1 Jan. 1997 p. 49.

Packaging Notes, Soap, Cosmetics, Chemical Specialties, Feb. 1997.

Super Tubes, Tube Graphics Jan./Feb. 1997.

Graphic Transfer System, Packaging, Mar. 1997.

Photo Quality Aluminum Tubes, Food & Drug Packaging, Jul. 1997 p. 37.

*Primary Examiner*—Curtis Mayes
*Assistant Examiner*—J. A. Lorengo
*Attorney, Agent, or Firm*—Heslin & Rothenberg, P.C.

[57] ABSTRACT

A method and apparatus for labeling a metallic container, such as an aluminum collapsible tube (empty and open-ended for filling by the purchaser) with a flexible label, which is especially suited to short production runs and in such a manner that the label is bonded to the container such that it is able to withstand physical abuse without peeling or breaking away from the container. Both the label and unlabeled container may be manufactured in advance and stored until needed. The container comprises an enamel coating which is bonded to the surface of the container, the coating comprising an adhesive which is activated within a predetermined temperature range, and the label comprises a transparent film having reverse printing on the lower surface thereof. The enamel coating is heated to a temperature within the activating temperature range to cause the adhesive to activate. The lower surface of the label is contacted to the heated enamel coating under sufficient pressure to cause the label to bond thereto. The temperature of the container and label is then reduced below the activation temperature range.

11 Claims, 2 Drawing Sheets

U.S. PATENT DOCUMENTS

| | | | |
|---|---|---|---|
| 4,219,596 | 8/1980 | Takemoto et al. | 428/41 |
| 4,427,744 | 1/1984 | Hume | 428/462 |
| 4,465,489 | 8/1984 | Jenkins et al. | 8/471 |
| 4,466,994 | 8/1984 | Hubbard et al. | 427/56.1 |
| 4,517,044 | 5/1985 | Arnold | 156/277 |
| 4,526,648 | 7/1985 | Tochtermann | 156/497 |
| 4,529,624 | 7/1985 | Hubbard | 427/148 |
| 4,534,582 | 8/1985 | Howard | 283/81 |
| 4,574,020 | 3/1986 | Fosnaught | 156/80 |
| 4,721,544 | 1/1988 | Zodrow et al. | 156/456 |
| 4,726,979 | 2/1988 | Chapman | 428/200 |
| 4,761,200 | 8/1988 | Szeremeta | 156/448 |
| 4,770,733 | 9/1988 | Chapman | 156/240 |
| 5,137,596 | 8/1992 | Potter | 156/497 |
| 5,156,711 | 10/1992 | Schwyn | 156/379.7 |
| 5,250,129 | 10/1993 | Twele | 156/64 |
| 5,271,783 | 12/1993 | Potter | 156/86 |
| 5,296,081 | 3/1994 | Morin et al. | 156/498 |
| 5,362,554 | 11/1994 | Holzer et al. | 428/283 |
| 5,366,251 | 11/1994 | Brandt et al. | 283/81 |
| 5,376,417 | 12/1994 | Amano et al. | 428/40 |
| 5,468,535 | 11/1995 | Amano et al. | 428/40 |
| 5,480,502 | 1/1996 | Rello et al. | 156/86 |
| 5,528,280 | 6/1996 | Endo et al. | 347/262 |
| 5,578,375 | 11/1996 | Kume et al. | 428/195 |
| 5,595,810 | 1/1997 | Beinert et al. | 428/156 |
| 5,621,864 | 4/1997 | Benade et al. | 395/117 |

METHOD AND APPARATUS FOR APPLYING A PRINTED LABEL TO A METAL CONTAINER AND THE LABELED CONTAINER PRODUCED THEREBY

FIELD OF THE INVENTION

This invention relates to a method and apparatus for applying a printed label to a metal container such as a collapsible tube, and to metal containers comprising such labels, which are especially suited for short production runs.

BACKGROUND OF THE INVENTION

Metal containers such as collapsible tubes used for pharmaceutical preparations, cosmetics, food, household and other products are sold throughout the world and are required to be decorated and printed with information. To decorate such containers with product information, etc., offset printing directly onto the containers (or onto an enamel coating on the containers) is normally used. However, this limits the quality, diversity and complexity of the print material (i.e. the design matter) because offset printing techniques are themselves so limited. Moreover, offset printing requires that lengthy set-up and change over procedures be conducted to implement a new design or change from one design to another.

Some product manufacturers require metal containers for products distributed to different countries each of which may have different marking requirements (i.e. due to national language and other differences). Often, relatively small shipments to any given foreign country are made at one time. Currently, manufacturers of such containers require the purchase of minimum orders (typically 10,000 units) of preprinted containers which must then be kept in inventory until required or discarded when rendered obsolete due to packaging changes. Often the minimum order is much more than a purchaser's requirements and the majority of the containers are scrapped.

To avoid such waste, it is desirable to print only the number of containers which are required at any given time. However, the cost to a container manufacturer to produce such small numbers of printed containers is prohibitive due to the cumbersome set-up procedures associated with offset printers which are most efficiently operated on a mass-production assembly line. Presently, collapsible containers of the type contemplated are normally produced in an assembly line which forms the container from raw materials such as an aluminum slug; coats the container's exterior with a polyester enamel which bonds to the surface of the container and provides an aesthetic appearance and accepts printing inks; prints material onto the container using offset printing techniques; cures the printed, enameled container; and, applies a cap to the top end of the container (the other end being left open for filling with product by the purchaser). The production line downtime required to configure the line, particularly the offset printing system, is the same for short runs as for longer runs. Thus, it is inefficient to produce shorter production runs.

An alternative to printing directly on the metal containers is to apply pre-printed labels to the containers but present labeling methods are not acceptable to a number of different industrial purchasers due to the lack of security associated with the labels applied by such methods. Typically, such methods use labels having a thin printed substrate and an adhesive backing layer and suffer the following disadvantages:

(a) The labels will not withstand the physical abuse, such as squeezing and crinkling, to which collapsible containers may be subjected by the public;

(b) The chemical contents of the container may react with the standard adhesive systems used to apply such labels, thereby potentially causing the adhesive to fail and the label to fall off; and, (c) Because the labels do not bond to the container they can be selectively removed from the container with solvents or other means leaving no evidence of tampering (and this is unacceptable to manufacturers facing potential product liability claims).

Adhesive labels (i.e. labels having a substrate, a print layer and an adhesive layer) are known in the art and are commonly used for decorating plastic containers. For example, Canadian Patent No. 1,259,183 issued on Sep. 12, 1989 provides such a label having an adhesive backing which bonds to the container. However, a disadvantage associated with adhesive-backed labels is that they require that certain handling and storage conditions be met so as to avoid compromising the adhesive prior to use. Moreover, such labels which are presently available do not accomplish bonding with a metal container.

It is also known to apply metallic layers or labels to metal surfaces having finish coatings thereon by using a transfer sheet, the transfer sheet having on it the metallic layer and an adhesive layer thereover and a release layer and releasable backing sheet thereunder. For example, U.S. Pat. No. 3,340,121 issued Dec. 20, 1963 provides for such a transfer sheet which is applied by heating the metal surface to a temperature at which the release layer is activated and the adhesive softens and then pressing the transfer sheet against the hot metal surface until the release layer is activated and the backing sheet can be removed after which time the metallic layer is adhered to the metal surface (the adhesive layer and finish coating being compatible). Such transfer sheets also have associated with them the disadvantage of structural complexity and handling and storage requirements and restrictions.

Also known is the method provided by U.S. Pat. No. 3,553,044 issued Jan. 5, 1971 for incorporating a decal as an integral part of a coating on a surface whereby a decal is printed onto a solvent soluble polymeric base, the decal-printed base is attached to the surface and a clear solvent-containing coating is applied over the base and surface so that the base is dissolved and the decal becomes an integral part of the coating. However, the use of such a solvent-based coating is unacceptable for many applications as is the need to coat the applied decal.

Therefore, it is desirable to provide a method of applying pre-printed graphic labels to metal containers which will render the label an integral part of the container and able to pass rigorous product handling tests such as the "crinkle test" by which the container is repeatedly bent in different directions and crinkled to ensure that the label remains intact and does not peel or break off from the container. It is also desirable to provide such a method that is conducive to short production runs of containers.

SUMMARY OF THE INVENTION

According to the invention there is provided a method of labeling a metallic container with a flexible printed label, the container comprising a metallic substrate and an enamel coating having an adhesive therein, the coating having bonded to the surface of the substrate and the adhesive being activated within a predetermined temperature range, and the label comprising a film. The enamel coating is heated to a temperature within the temperature range to cause the adhesive to activate. The label is contacted to the heated enamel coating under sufficient pressure to cause the label to bond thereto. The temperature of the container and label is then reduced below the temperature range. The container may be a collapsible tube and the substrate may be aluminum. Preferably the film is transparent, comprised of polypropylene and has computer generated reverse printing comprising plastic ink on the surface thereof which is bonded to the coating. The adhesive is preferably a polymer.

Also provided in accordance with the invention is an apparatus for labeling a metallic container with a flexible printed label comprising means for heating the enamel coating to a temperature within the temperature range to cause the adhesive to activate and means for contacting the label to the heated enamel coating under sufficient pressure to cause the label to bond thereto.

Further in accordance with the invention there is provided a metallic container having a printed label bonded thereto. The labeled container comprises a metallic substrate and an enamel coating having an adhesive therein, the coating having bonded to the surface of the substrate. A printed flexible film bonded to the coating whereby the printed film is integral with the substrate and is not removable therefrom without causing perceptible damage to the substrate. Also provided is a preprinted label in combination with a coated metallic container wherein the label comprises a flexible film and the coated container comprises a metallic substrate and an enamel coating having an adhesive therein, the coating having bonded to the surface of the substrate. The adhesives activated within a predetermined temperature range such that the film becomes bonded to the coating if the film is applied to the coating at the time the adhesive is activated.

DESCRIPTION OF THE DRAWINGS

The present invention is described in detail below with reference to the following drawings in which like reference numerals refer throughout to like elements.

DETAILED DESCRIPTION

Figure 1:
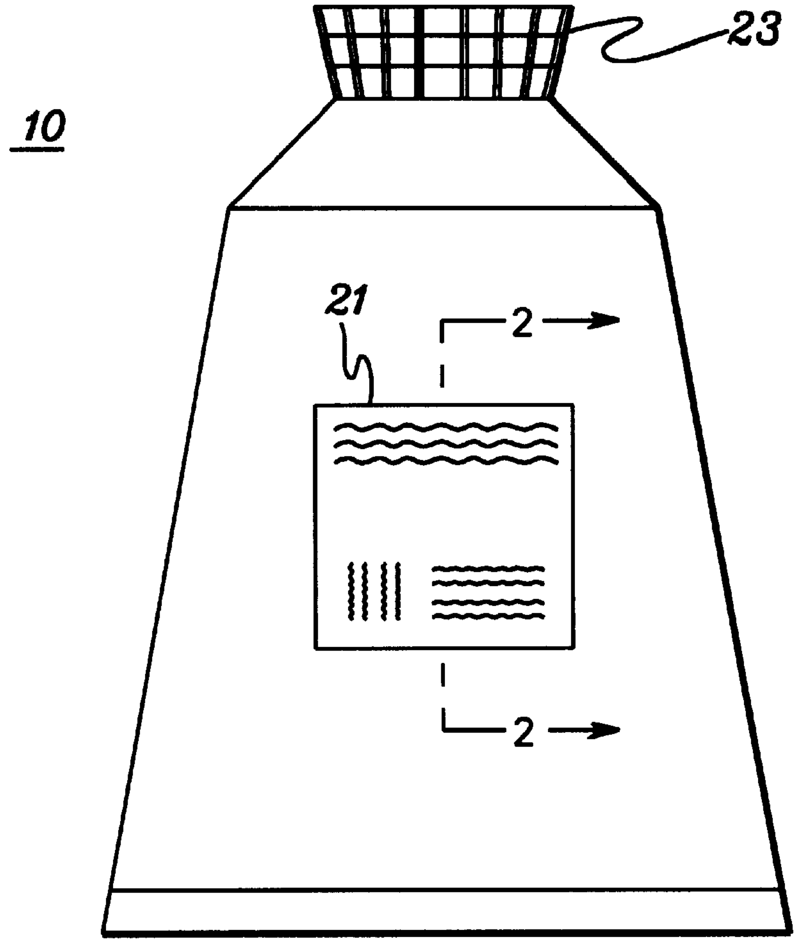
FIG. 1 is a plan view of a container (a collapsible tube) having a label thereon in accordance with the invention.

With reference to FIG. 1 there is shown an already filled container 10 being a collapsible aluminum tube of the type used to package pharmaceutical compositions, cosmetic and other products. A plastic cap 23 is provided at one end over a threaded neck. The bottom of the tube is left open (not shown) at the time the tube is manufactured and is sold to customers in that form. The purchaser of the tube fills it with the product it is to contain and then crimps and seals the open end as shown in FIG. 1. The label 21 has been applied to the container 10 as hereinafter described according to the invention. For convenient illustration the container shown by FIG. 1 is a filled container but the term "container" herein refers most importantly to unfilled, open-ended containers to which print material is applied before the containers are sold and then filled by the purchaser. Also, for convenient illustration a patch-type label (only) is shown in FIG. 1 but it is to be understood that the label may be of any sufficient practical size and is preferably a size large enough to substantially wrap the container. The plastic cap 23 is well known in the art and is typically manufactured from HDPE or LDPE and is therefore heat sensitive.

Figure 2:
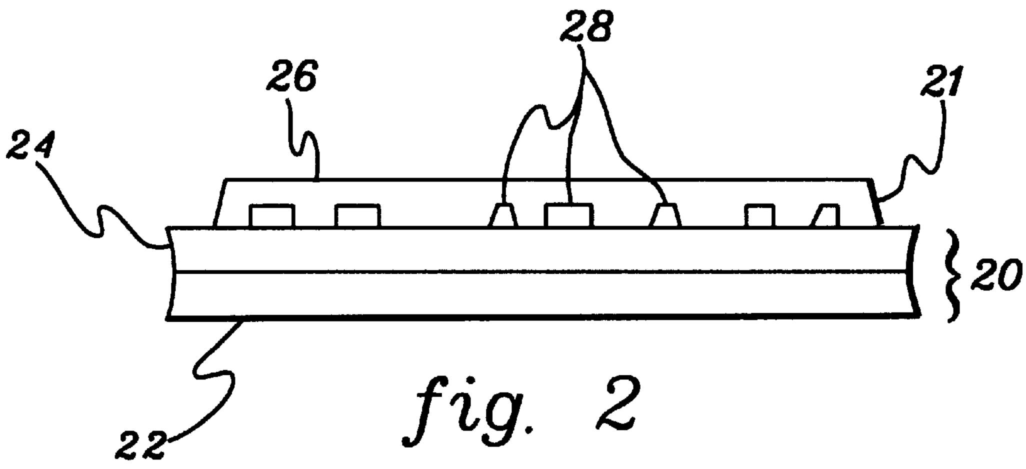
FIG. 2 is cross-sectional view of the container of FIG. 1 taken through lines 2—2; and, FIG. 3 is a side elevation of an apparatus for applying a label to a container in accordance with the invention.

The preferred container comprises a collapsible aluminum tube substrate 22 in accordance with the prior art to which a polymer-containing enamel coating layer 24 is bonded, as best shown in FIG. 2. A printed, transparent film layer 26 is bonded to the coating layer 24 such that the film layer 26 forms an integral part of the container 10. The transparent film layer 26 preferably has on a lower surface thereof reverse printed indicia comprising ink 28 which is also bonded with the coating layer 24. It should be understood, however, that the print indicia could be positioned on the upper side of the film layer 26 in which case the print layer would not be reverse printed and the film need not necessarily be transparent. In such an embodiment the print layer would not be protected by the film layer 26.

Although the container described herein is a collapsible tube the method of applying the label according to the invention may also be advantageously applied to rigid metal containers such as aerosol containers.

As is well known in the art, the interior surface of a container may also have a coating layer [not shown] of a suitable composition to prevent any chemical reactions between the container substrate and the intended contents for the container.

Enamel coatings used on collapsible metal tubes are generally known in the art and a variety of different product compositions are available in the marketplace. The use of an enamel layer such as a polyester enamel provides a pleasing feel and aesthetic appearance for the container and, with respect to prior art techniques, provides a surface on which to directly apply printing ink using offset printing systems. For containers intended for the pharmaceutical industry the choice of suitable enamel coatings is more limited as these must meet the applicable regulatory standards set by various regulatory agencies.

In accordance with the present invention the selected enamel coating is a polyester enamel comprising a sufficient quantity of a polymer which provides adhesive characteristics to the coating. The adhesive character of the composition is heat activated within a specific temperature range and enables the coating layer 24 to chemically bond with the film layer 26 and printed indicia 28 which are applied to it.

The polyester enamel/polymer adhesive composition which has been adopted for use in the embodiment herein described is manufactured by HOBA Lacke Und Farben GmbH and sold under product number PN9221. The essential ingredients of this composition are polyester and polyvinyls. Since the potential range and multiplicity of suitable adhesive components which might operate successfully in the enamel formulation is broad, it is not practical to stipulate herein those precise formulations that are or are not suitable for the invention. Rather, it is possible only to stipulate and describe the properties of the adhesive-containing enamel necessary to the intent and performance of the invention; and this will enable one skilled in the art to select appropriate enamel compositions for any given application. Although the enamel adhesive formulation disclosed herein is suitable for the disclosed embodiment it should be understood that other functional examples may be devised and that the invention is not limited to or by the disclosed adhesive enamel formulation.

As further described below, the minimum activation temperature at which the enamel exhibits the desired adhesive properties cannot exceed the temperature at which the other materials, including the cap 23, interior coating and film layer 21, applied to the container may begin to melt or otherwise become distorted. For the selected coating composition as identified above the adhesive therein is activated within a temperature range of about 118° C.–140° C. (245° F.–284° F.). Beyond these temperatures the adhesive properties (which are essential to the working of the invention) become permanently destroyed.

A variety of materials may be suitably employed for the printable film layer 26. The selected material must not be affected by the intended contents of the container. As well, it must be flexible to withstand the normal physical stresses given to a collapsible container such as bending and squeezing without sustaining any damage. The film layer must also withstand the process of application to the enamel coating, as further described below, with no resultant distortion of any printing thereon or other undesirable physical changes. When applied to an enamel coated container, the label must be chemically stable and not degrade over long periods of time. No changes in visual appearance or adhesion can be allowed. The film layer may be treated or otherwise modified to enhance printability as is well known in the art.

The film adopted for use by the inventors is polypropylene manufactured by Mobil Chemicals and having a thickness of 25 microns. The film layer 26 is printed prior to its application to a container and because the pre-printed film is stable and has a long shelf-life it may be stored in inventory and used as and when needed. The preferred printing means is a computer-controlled digital printer supplied by Indigo America (at Unicorn Park Dr., Woburn, Mass. U.S.A. 01801) and sold under the Trademark OMNIUS which provides the following advantages. First, the quality and diversity of the print material (image) which this printer is able to produce is far superior to other printing methods such as offset printing. Second, the set-up and change over times and procedures required to change from one image to another is minimal as compared to other printing methods. Third, the inks used by this printer are plastic and these plastic inks also bond to the enamel coating layer 24 at the temperatures required for the application of the film layer 21 to the (unfilled) coated container 20.

In order to produce a labeled container according to the invention a transparent film layer 26 is reverse printed according to the specifications of the chosen printing technique to create a label 21. A container 20 is coated according to conventional means with the enamel/adhesive composition 24 and dried at a temperature which is no greater than 140° C. so as to ensure that it is not heated to a temperature at which the composition will lose its adhesive properties, the adhesive properties being present only within a predetermined range, this being about 118° C.–140° C. for the composition used by the inventors. It has been found that this drying temperature is sufficient to render the enamel dry to the touch so that the coated tube can be handled. (Note that according to the prior art offset printing method the enamel coating is dried at a higher temperature, in area of 190° C., to more thoroughly dry the enamel but at the same time causing the adhesive properties of any polymer in the enamel to be permanently destroyed.) If desired, this may be done long in advance of the labeling steps in which case the coated containers would be maintained in inventory and used as and when needed. It is critical that the coated containers not be heated to a temperature beyond which the enamel will lose its adhesive properties.

To apply the label 21 to the container 20 the enamel/adhesive coating 24 is heated so that the adhesive attains but does not exceed a temperature in the range 118° C.–140° C. at which it is activated and without applying so much heat to the cap 23 as to cause damage to it. The label 21 is then transferred onto the container 20 by contacting the label 21 with the coating 24 under sufficient pressure to achieve the transfer. The resulting labeled container is then cooled, preferably to ambient temperature.

To heat the coating 24 and apply the label 21 the cylindrical container 20 is mounted for rotation on a mandrel and the mandrel is heated until the coating 24 reaches the required temperature. The label 21 is positioned on a receiver or plate. Once heated, the container 20 and the label 21 are brought into contact under sufficient pressure and the container 20 is rolled across the label 21. Pressure is applied between the container 20 and label 21 to obtain an even bonding without wrinkles or other deformation. A pressure range of about 0.5 to about 5 bar has been found to be sufficient.

Figure 3:
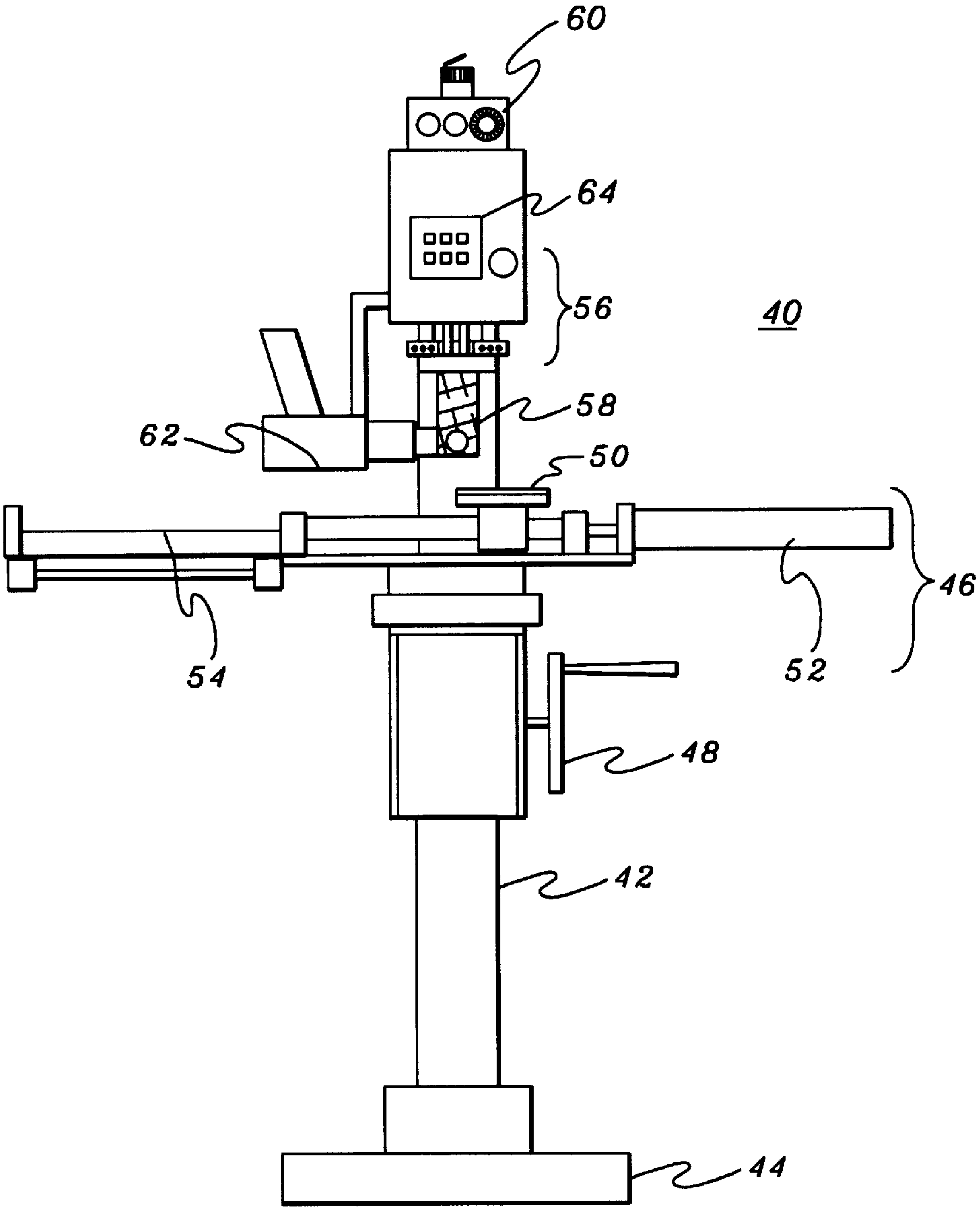

With reference to FIG. 3 there is shown a non-production example of a labelling apparatus 40 for labeling a container in accordance with the invention. The apparatus includes a frame 42 mounted on a base 44. A label station 46 is mounted for vertical movement to the frame. The vertical height of the station may be adjusted by an adjustment mechanism 48 to account for various sizes of containers to be labelled. The label station includes a label receiver having a plate 50 constructed of a material which will withstand the temperatures to which it is to be subjected to and provide a compressible surface to avoid damaging the tube during the labeling thereof, silicon rubber being preferred by inventors. Film materials are subject to high static charges and the resulting “static cling” is usefully employed to hold the labels in place on the label receiver.

The label receiver is mounted for horizontal movement between a label receiving position to a container labelling position. A pneumatic controlled drive system 52 including a hydraulic brake system 54 provides controlled horizontal movement of the plate bearing the film under the container during application of the label.

Mounted above the film receiver is a container station 56 including a container receiver in the form of a substantially cylindrical mandrel 58, mounted for free rotation. The container receiver is also mounted for vertical movement toward and away from the label receiver, between a container mounting and heating position to a container labeling position. The vertical movement of the container receiver is controlled by a drive control system 60 for controlling speed and the pressure on which the mandrel of the container receiver may press against the label receiving plate at the container labeling position.

A forced hot air heater 62 is mounted adjacent the container receiver at the container receiving and heating position. The heater gun provides a heating means for heating (indirectly, through the mandrel) the enamel/adhesive coating so that the adhesive obtains but does not exceed the said activation temperature range and without overheating the cap or spot-heating (i.e. uneven heating) the enamel.

A programmable control system 64 is provided to enable an operator of the apparatus to control dwell times of the container receiver at various positions during labeling and to maintain a count of labeled containers produced.

In operation, a pre-printed film layer label 21 to be applied to a container is positioned on the label receiving plate in the film receiving position. The heater is operated to pre-heat the mandrel. The enamel coated container 20 is mounted on the pre-heated mandrel of the container receiver in the container heating and mounting position. The container 20 and in turn the coating layer 24 is heated by the preheated mandrel so that the coating obtains but does not exceed said temperature range sufficient to activate the adhesive.

The respective drive systems for the container receiver and label receiver are operated to transfer the film layer onto the container substrate by respectively moving the container receiver and label receiver to the container labeling position, thus contacting the heated polymer coating layer on the container with the label. The horizontal movement of the label receiver is continued at a controlled speed under the container causing the container coating to be rotated across and into contact with the remainder of the label. The container receiver and label receiver are returned to their respective starting positions and the resulting labeled container is dismounted and cooled.

It is understood that modifications to the apparatus are contemplated by the applicants. For example, the mandrel may be heated by other means such as an electrical resistance heater mounted within the mandrel and controlled by a rheostat and temperature sensor. Alternatively, it is possible that the hot air could be applied directly to the enamel/adhesive so long as the heating of the enamel/adhesive can be controlled to avoid over-heating or spot-heating the coating. As well, the relative movements of the container 20 and label 21 on applying the label to the container may be varied, one possibility being to instead hold the label receiver in place as the container is moved horizontally and rotated across and into contact with the label.

What is claimed is:

1. A method of labeling a metallic container with a flexible printed film, said method comprising the steps of:

(a) providing a metallic container having thereon an enamel coating, said enamel coating comprising an adhesive which is activated within a predetermined temperature range and said enamel coating having been dried on said container at a temperature not exceeding said temperature range whereby said enamel coating is dry to the touch but the adhesive property thereof has not been destroyed;

(b) heating said enamel coating to a temperature within said temperature range to cause said adhesive to activate;

(c) contacting said film to said heated enamel coating under sufficient pressure to cause said film to bond thereto; and, (d) reducing the temperature of said container and film below said temperature range.

2. The method of claim 1 wherein said container is a collapsible, aluminum tube.

3. The method of claim 1 wherein said container is an aerosol can.

4. The method of claim 2 wherein said film is transparent and has reverse printing on a surface thereof.

5. The method of claim 4 wherein said film is polypropylene, said adhesive is a polymer and said temperature range is 118° C.–140° C.

6. The method of claim 5 wherein said printing comprises a plastic ink which bonds to said coating when said film is bonded thereto.

7. The method of claim 6 wherein said reverse printing is computer generated.

8. The method of claim 7 further comprising the steps of:

(e) mounting said container onto a container receiver for rotation;

(f) positioning said film on a film receiver;

(g) transferring said film onto said container by contacting said coating with said film and rotating said container across said film under pressure; and, (h) removing from said container receiver the resulting labeled container.

9. The method of claim 8 wherein said container receiver is a cylindrical mandrel and said film receiver is a plate.

10. The method of claim 8 wherein said container receiver is heated to heat said coating.

11. The method of claim 10 wherein said heating is by forced hot air.

* * * * *

UNITED STATES PATENT AND TRADEMARK OFFICE

CERTIFICATE OF CORRECTION

PATENT NO. : 6,054,006

DATED : April 25, 2000

INVENTOR(S) : Pilon et al.

It is certified that error appears in the above-identified patent and that said Letters Patent are hereby corrected as shown below:

IN THE CLAIMS:

Claim 1, Col. 8, line 2, delete "to bond" and replace with --to chemically bond--.

Claim 8, Col. 8, line 22, delete "7" and replace with --6--.

Signed and Sealed this

Third Day of April, 2001

*Attest:*

Nicholas P. Godici

NICHOLAS P. GODICI

*Attesting Officer*

*Acting Director of the United States Patent and Trademark Office*